June 8, 1948.  F. W. TREPTOW  2,442,788
TARGET COURSE SIMULATING MECHANISM FOR
OBJECT LOCATING TRAINING SYSTEM Filed Dec. 6, 1943  6 Sheets-Sheet 1

FIG. I

INVENTOR
F. W. TREPTOW
BY
ATTORNEY

June 8, 1948.  F. W. TREPTOW  2,442,788
TARGET COURSE SIMULATING MECHANISM FOR
OBJECT LOCATING TRAINING SYSTEM
Filed Dec. 6, 1943  6 Sheets-Sheet 2

INVENTOR
F. W. TREPTOW
BY
ATTORNEY

INVENTOR
F. W. TREPTOW
BY
ATTORNEY

June 8, 1948.                F. W. TREPTOW                 2,442,788
                TARGET COURSE SIMULATING MECHANISM FOR
                    OBJECT LOCATING TRAINING SYSTEM
Filed Dec. 6, 1943                                  6 Sheets-Sheet 4

INVENTOR
F. W. TREPTOW
BY
ATTORNEY

June 8, 1948.  F. W. TREPTOW  2,442,788
TARGET COURSE SIMULATING MECHANISM FOR
OBJECT LOCATING TRAINING SYSTEM
Filed Dec. 6, 1943  6 Sheets-Sheet 5

INVENTOR
F. W. TREPTOW
BY
ATTORNEY

June 8, 1948.  F. W. TREPTOW  2,442,788
TARGET COURSE SIMULATING MECHANISM FOR
OBJECT LOCATING TRAINING SYSTEM Filed Dec. 6, 1943  6 Sheets-Sheet 6

INVENTOR
F. W. TREPTOW
BY
ATTORNEY

Patented June 8, 1948

2,442,788

UNITED STATES PATENT OFFICE 2,442,788

TARGET COURSE SIMULATING MECHANISM FOR OBJECT LOCATING TRAINING SYSTEM

Frederick W. Treptow, Rutherford, N. J., assignor to Bell Telephone Laboratories, Incorporated, New York, N. Y., a corporation of New York Application December 6, 1943, Serial No. 513,085

7 Claims. (Cl. 35—10)

This invention relates to object-locating systems and particularly to systems of this character which simulate the courses and movements of objects in space.

The objects of the invention are to simulate at will any desired course of an object moving in space; to generate a course in which the range and angular relation with respect to a reference point varies in any desired manner; to enlarge the scope and utility of course-generating mechanisms; and in other respects to obtain improvements in mechanisms of this character.

Object-locating systems have been devised for following or tracking an airplane or other object moving along a variable course in space. In one such system directive radio impulses are transmitted from the point of observation to the airplane from which they return as echo impulses. These returning impulses are received and utilized to form on a screen before the operator moving images which serve as a continuous representation of the range and angle, either azimuth or elevation, of the moving airplane. The operator is also provided with means, such as hand wheels, which he manipulates to follow or otherwise control these changing images. If he manipulates his range wheel accurately its position at any instant is an exact measure of the range of the moving airplane, and the same is true with respect to the hand wheels with which he follows the azimuth and elevation angles.

Since the accuracy of the information obtained from these object-locating systems depends largely upon the proficiency of the operators, it is desirable to give the operators a preliminary course of training under conditions which simulate as closely as possible the actual conditions which they will ultimately encounter in operating the object-locating systems. To this end it has also been proposed heretofore to generate artificial courses which simulate the courses of objects, such as airplanes, moving in space and to utilize these simulated courses for the purpose of training students. However, the course-generating mechanisms heretofore proposed have been subject to certain limitations which make it difficult to simulate all types of courses of flights that are likely to be encountered in actual practice. This limitation is particularly true with respect to courses which pass directly over the point of observation.

Accordingly the present invention contemplates a flight-generating or course-simulating mechanism which is capable of simulating a wide variety of courses, including those which pass directly over the point of observation, and to utilize these courses to provide the necessary range and angular information with which to train the student in the art of following real objects in motion.

A feature of the invention is a course-generating mechanism comprising a movable element driven along the length of a shaft to represent the moving object in space and an azimuth member rotatable about an axis including the point of observation for representing the changing azimuth angle of said moving object with respect to said point, in which said driving shaft may be translated at will to choose any desired course, including an overhead course which passes directly over said point of observation, in which the movable element when generating any course other than the one overhead applies a force for rotating said azimuth member to indicate the changing azimuth angle, in which this force is reduced to zero to prevent rotation of said azimuth member when said movable element is generating the overhead course, and in which auxiliary means is effective as the overhead point in the course is reached for subjecting said azimuth member to an angular rotation equal to the abrupt change in azimuth angle which occurs when the moving object passes through the point in an overhead course which lies directly over the point of observation.

These and other features of the invention will be described more fully in the following detailed specification.

In the drawings accompanying the specification:

The purpose of a training system, of which the course generator is a part, is to prepare students to operate an object-locating system under actual conditions which may vary over wide ranges. Accordingly, an effort has been made to give the instructors a choice of imaginary courses simulating all of the actual conditions which the student is likely to encounter when he is called upon later to manipulate a system for locating real objects. While the dimensions of primary interest in determining the position of the moving object in space are range, azimuth angle, and elevation angle, the methods used for following the two angular dimensions mentioned are much the same. For training purposes, therefore, it is sufficient to generate courses in which the range and one of the angular dimensions, such as the azimuth angle, undergo the desired rate of change, the other-mentioned angle being omitted. To this end the course generator herein disclosed is so arranged that the instructor may preselect courses representing a wide variety of range and azimuth changes. Furthermore, the instructor is provided with means for varying the speed with which the imaginary object moves along the simulated course. The course generator, once set by the instructor, will describe a straight-line course of flight which is perpendicular to the line drawn through the point of observation and bisecting the course, and the elevation of the course will remain uniform throughout its length. However, the instructor may, if he so desires, introduce variations in the range and azimuth angles during the generation of the course. That is to say, he can, by manipulating his control device while the course generator is in operation, vary at will the rate of change of the range and azimuth angle.

Figure 10:
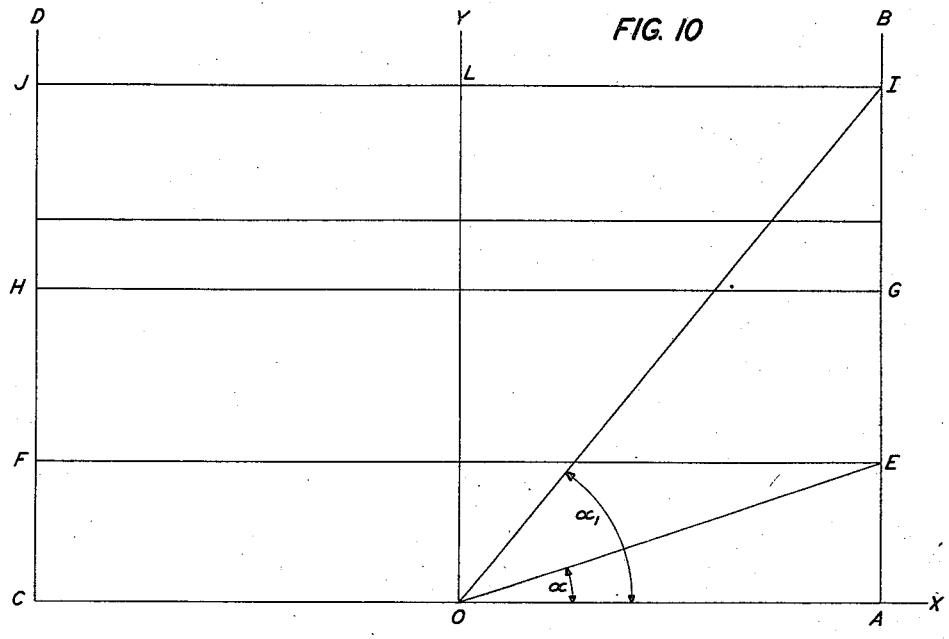
Fig. 10 is a chart illustrating the generated courses.

Referring to Fig. 10, which illustrates the courses available to the instructor, it is assumed that O is the student's point of observation. This point is located at the intersection of line OX and the perpendicular line OY, the line OX being perpendicular to the boundary lines AB and CD which mark the beginning and ending of all courses. As above noted, the generator, if undisturbed during its operation, will generate straight-line courses, such as lines EF and GH, perpendicular to the line OY. Since the generator is not designed to take the elevation angle into account, it may be assumed that all courses generated lie either in the horizontal plane determined by the lines OX—OY or in a horizontal plane parallel thereto. Considering the parallel courses EF, GH, etc., the length of which may be assumed to be 50,000 yards, it will be noted that the rates of change of range and azimuth angle differ widely depending on the location of the course with respect to the point of observation. If the range is taken as the distance from the point O to the point of the imaginary object on the course, such as the distance OE when the object is at the starting point E of the course EF, and if the azimuth angle is taken as the angle α formed between the range line OE and the axis OX, the range of these dimensions increases rapidly as the course line approaches the axis OX. For example, the rate of change of range and azimuth is much smaller for the course line IJ than it is for the course line EF, and intermediate rates of change may be had by choosing intermediate courses. During the first half of any chosen course the range changes in one sense until the midpoint is reached at the line OY, and during the second half of the course it changes in the opposite sense. For instance, the range of the course starting at the point E changes at a decreasing rate for constant speed of flight until the midpoint K is reached, whereupon the range changes at an increasing rate from the point K to the end point F of the flight. During the first half of the course EF the azimuth angle α lies in the first quadrant and increases from its starting value to 90 degrees at the midpoint K, and during the second half of the course the angle shifts to the second quadrant and increases toward its final value, 180 degrees minus its starting value. As the course line approaches the axis OX, the starting value of α decreases until it finally reaches zero for a course which is directly overhead the point of observation O. In this case the azimuth angle is zero at the start of the course and remains zero until the midpoint is reached, whereupon it suddenly shifts to the second quadrant and becomes equal to 180 degrees. Thus the problem of the course generator is to execute this change of azimuth angle when the instructor chooses a course which is directly overhead or substantially so.

Figure 11:
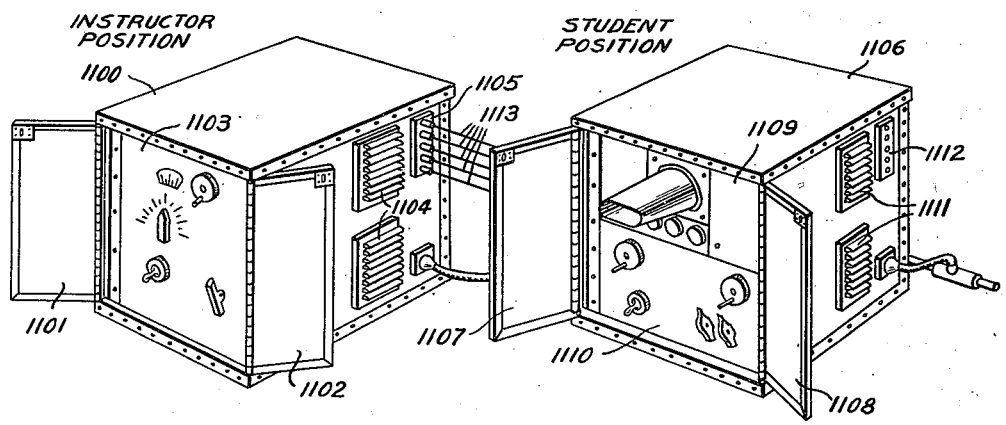
Fig. 11 illustrates the instructor's apparatus cabinet and one student's apparatus cabinet as they would be set up for training purposes.

The apparatus at the instructor's position is mounted in an apparatus cabinet 1100, shown in Fig. 11, having front closure doors 1101 and 1102 and a control panel 1103. The sides of the cabinet are provided with ventilation slots 1104 and with cable jacks, such as 1105, by which the instructor's cabinet may be connected with one or more students' positions. The apparatus at a student's position is mounted in an apparatus cabinet 1106, shown in Fig. 11, having front closure doors 1107 and 1108, a panel 1109 on which are mounted an oscilloscope and controls therefor, and a control panel 1110. The sides of the cabinet 1106 are provided with ventilation shots 1111 and with cable jacks, such as 1112, by which the cabinet may be connected by plug-ended cables 1113 with the instructor's apparatus cabinet 1100 and with other students' cabinets similar to cabinet 1106.

The generator disclosed in Figs. 1 to 8 comprises a housing 1 which encloses and supports the various elements of the mechanism. Essentially this device consists of a movable member or tracing head 2 capable of being driven along any one of a large multiplicity of paths within the housing 1, to represent on a small scale the imaginary airplane moving along the simulated course in space which, as above mentioned may be 50,000 yards in length. As will be explained presently the tracing head 2 is driven by an electrical motor from one end of its course to the other within the housing 1, and the location of its course in terms of range and azimuth angles is determined by the setting which the instructor gives the mechanism.

The course tracing head 2 is slidably supported on horizontal guide rods 3 and 4. The length of the rods 3 and 4 corresponds to the length of the course, and the tracing head 2 is driven from one end of the rods to the other by means of a threaded shaft 5 which engages a threaded opening in the head 2. The guide rods 3 and 4 and the threaded shaft 5 are supported on a carriage 6 which is arranged for sliding movement on the horizontal guide rods 7 and 8. The rods 7 and 8 are secured to the front and back plates of the housing 1. The sliding movement of the carriage 6 on the rods 7 and 8 is controlled by a screw 9, and it in turn is operated by the instructor's hand wheel 10 mounted on the front plate of the housing.

The tracing head 2 is driven from one end to the other of the carriage 6 by means of a motor 11 supported on the carriage for movement therewith. The driving connection between the motor and the tracing head 2 consists of a worm gear 12 on the motor shaft and a cooperating pinion 13 secured to the threaded shaft 5. The worm gear and pinion are located within a small housing 14, which may be integral with or otherwise secured to the carriage 6. By mounting the motor 11 in this manner it is possible to drive the tracing head 2 in either direction along the guide rods 3 and 4 by choosing the corresponding direction of rotation for the motor.

It will now be seen that the movement of the tracing head 2 from one end of the carriage 6 to the other is capable of generating within the relative small volume of the housing 1 a multiplicity of course, each of which is on a small scale a facsimile of an imaginary course in space which might be traversed by an airplane flying over a distance of 50,000 yards. Moreover, it will be seen that the position of the carriage 6 on the guide rods 7 and 8 determines the instant values of the range and azimuth angle of the tracing head 2 with respect to a fixed point of reference and determines similarly the instant values of these dimensions for the imaginary airplane flying in space. The instructor preselects the course line which he wishes the tracing head 2 to describe by manipulating the hand wheel 10 to adjust the carriage 6 horizontally until the tracing head 2 occupies the desired position.

It is convenient to represent the range and azimuth in terms of electrical quantities; therefore, the movement of the tracing head 2 may be utilized to operate variable resistors or condensers to establish potentials or charges or similar electrical quantities that vary in accordance with the varying values of the range and azimuth dimensions. To this end the tracing head 2 is connected through a link pin 15 to the toothed bar or rack 16, which in turn is arranged to travel freely in a key-way formed in the azimuth head or frame 17. The upper end of the link pin 15 is rigidly secured to the tracing head 2, and the lower end thereof terminates in a suitable joint, such as a ball and socket joint, for permitting free relative movement between the pin and the rack. The teeth on the underside of the rack 16 mesh with a driving pinion 18 which is secured with the gears 19 and 20 on a shaft 21. Any sliding movement of the rack 16 therefore rotates the shaft 21 causing the gears 19 and 20 to rotate the pinions 24 and 25, which in turn rotate the shafts 40 and 41 on which are mounted the movable elements of the electrical devices 22 and 23, illustrated in the drawings as variable resistors. Resistors 22 and 23 represent the range of the simulated course.

The azimuth head or frame 17 is secured to an azimuth shaft 26 for rotation therewith, and the azimuth shaft is suitably supported by bearings in the auxiliary frame 27. The shaft 26 carries a bevel gear 28 which meshes with the two oppositely disposed gears 29 and 30. The gear 29 is fixed to the rotor shaft 42 and shaft of variable resistors 31 and 32 mounted on opposite sides of a bracket 33. These resistors represent the azimuth angle of the simulated course, and it will be seen that the movement of their rotors corresponds to the rotation of the azimuth frame 17 under the control of the tracing head 2.

The beveled gear 30, which also meshes with the gear 28 on the azimuth shaft 26 is secured to a shaft carrying the gear wheel 34 which in turn meshes with a pinion 35 on the rotor shaft 43 of a torque motor 36. The purpose of this motor is to rotate the azimuth shaft 26 and the frame 17 secured thereto through an angle of 180 degrees to represent the abrupt change in azimuth angle which is experienced in an overhead course when the object moving along the course passes through the point directly above the point of observation. This auxiliary force is needed to rotate the frame 17 at this time by reason of the fact that the tracing head 2 exerts no turning force on the frame 17 when an overhead course is being generated. To this end the motor 36 is of such design that its armature is constantly exerting a force tending to rotate the shaft 26 but which is insufficient under normal conditions to have any effect upon said shaft. However, as will be explained presently, when the generator has been adjusted by the instructor to generate an overhead course, the torque motor 36 comes into play at the midpoint of the course to execute a rotation of 180 degrees in the position of the shaft 26 preparatory to the generation of the second half of the course.

To explain the mechanism in its detailed operation it will be assumed that the instructor wishes to simulate the course IJ (Fig. 10) which has a relatively large passing distance OL. Assume also that following the last previous use of the generator the tracing head 2 was left in the extreme right-hand position (Fig. 1) on the carriage 6. Accordingly the instructor manipulates the hand wheel 10 to move the carriage 6 along the rods 7 and 8 until the rack 16 is withdrawn from the key-way in the frame 17 to a position where the distance from the link pin 15 to the axis of the azimuth shaft 26 represents the starting range line OI (Fig. 10) and the angle formed by the rack 16 with the X axis passing through the azimuth shaft 26 and containing the point O of observation corresponds to the starting azimuth angle $a_1$. Having thus positioned the carriage 6 to preselect the desired course, the instructor chooses the desired speed of flight by adjusting the speed control pointer 37 and operates the switch 38 to close a circuit for operating the motor 11 in the proper direction for driving the tracing head 2 toward the other end of the carriage 6.

As the tracing head 2 moves along the guide rods 3 and 4 under the influence of the rotating threaded shaft 5 it slides the rack 16 into the key-way in the azimuth frame 17, thus reducing the range or the distance between the link pin 15 and the axis of the azimuth shaft 26 and expressing this changing value of range by rotating the movable elements of the resistors 22 and 23. Also as the tracing head 2 proceeds along the guide rods 3 and 4 it transmits a force through the link pin 15 and rack 16 which rotates the azimuth frame 17 and shaft 26 thus changing the value of the azimuth angle and expressing this changing value by a corresponding rotation of the resistors 31 and 32. When the tracing head 2 reaches the midpoint of the carriage 6 corresponding to the midpoint L of the course, the rack 16 is perpendicular to the X axis passing through the shaft 26 and the range or passing distance OL is represented by the distance from the center of the shaft 26 to the axis of the link pin 15. As the motor 11 continues to rotate, the tracking head 2 moves from the midpoint toward the end point of the course and in so doing withdraws the rack 16 from the key-way in the frame 17 to represent an increasing range during the second half of the course. It will be noted that the range resistors 22 and 23 rotate in one direction during the first half of the course and in the opposite direction during the second half of the course. While circuits may be devised to make use of the absolute values of the voltage developed by these resistors, it is usually the practice to employ the rate of change of potential or other electrical quantity for controlling the student training system. Also during the second half of the course the tracking head 2 continues to exert its force to rotate the frame 17 and azimuth shaft 26 in the same direction representing the changing value of the azimuth angle in the second quadrant. When the tracking head 2 reaches the opposite end of the carriage 6 corresponding to the terminating point J of the simulated course, the motor 11 is stopped in any suitable manner to prevent further rotation of the shaft 5. One convenient method of stopping the motor is to provide a plunger-operated switch 39 at each end of the carriage 6, so that the motor circuit is opened automatically whenever the head 2 reaches the end of its course in either direction.

Figure 1:
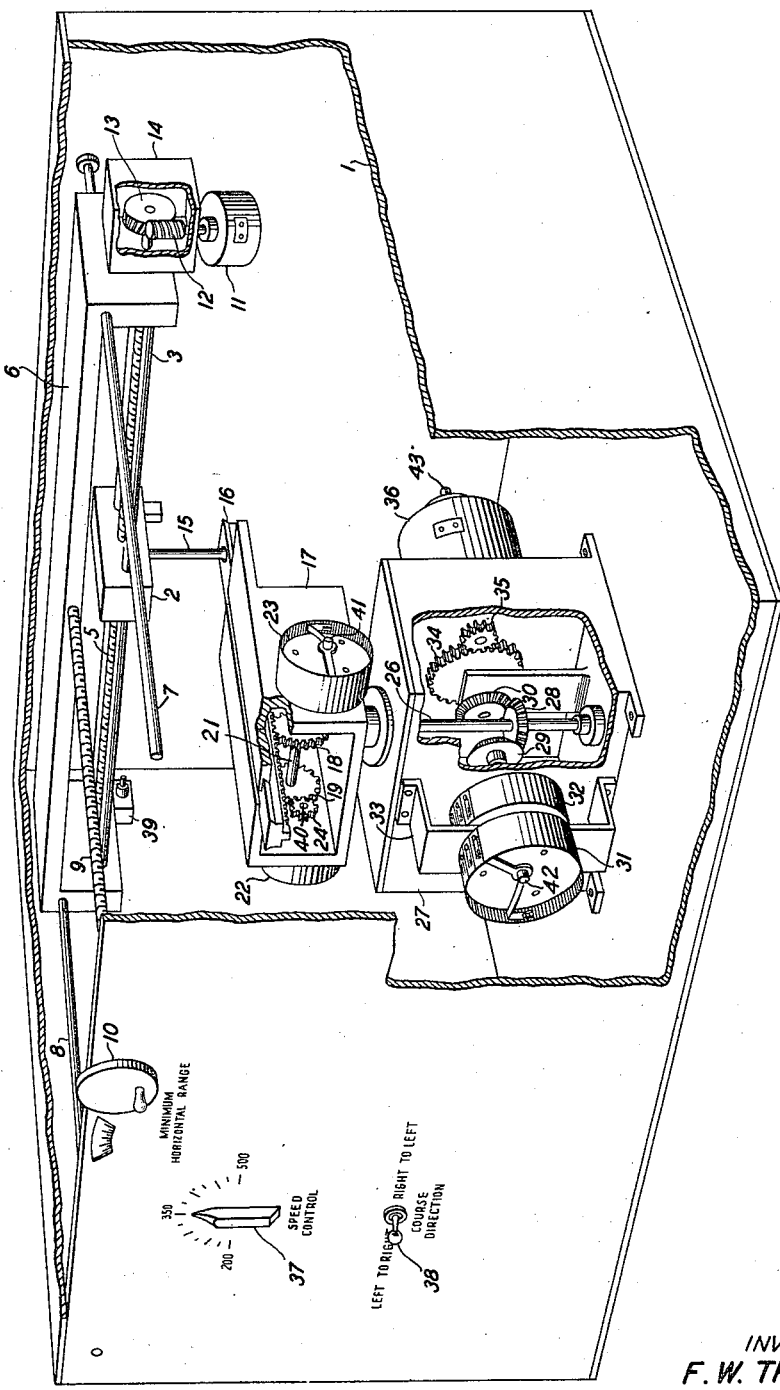
Fig. 1 is a perspective view of the course generator.
Figures 2, 3:
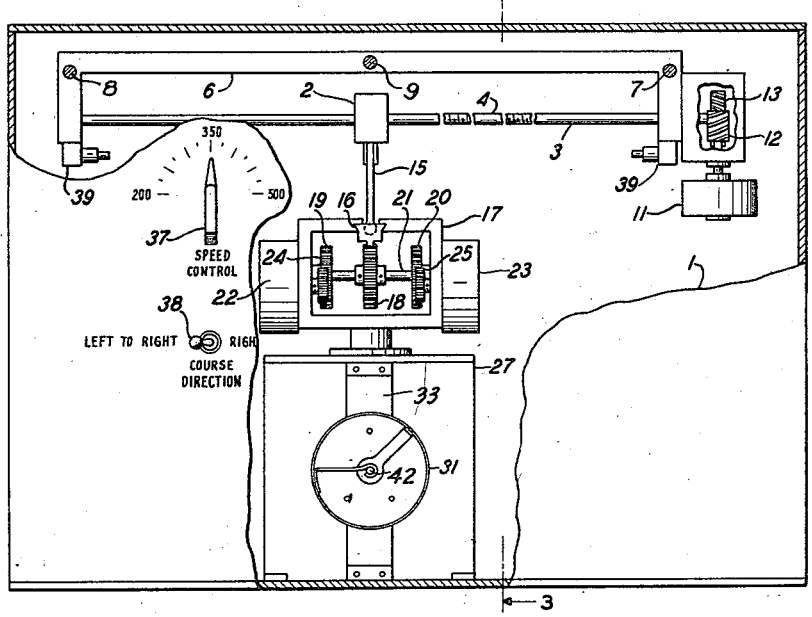
Figs. 2 and 3 are front and side views respectively of the generator with the parts occupying the positions shown in Fig. 1.
Figure 4:
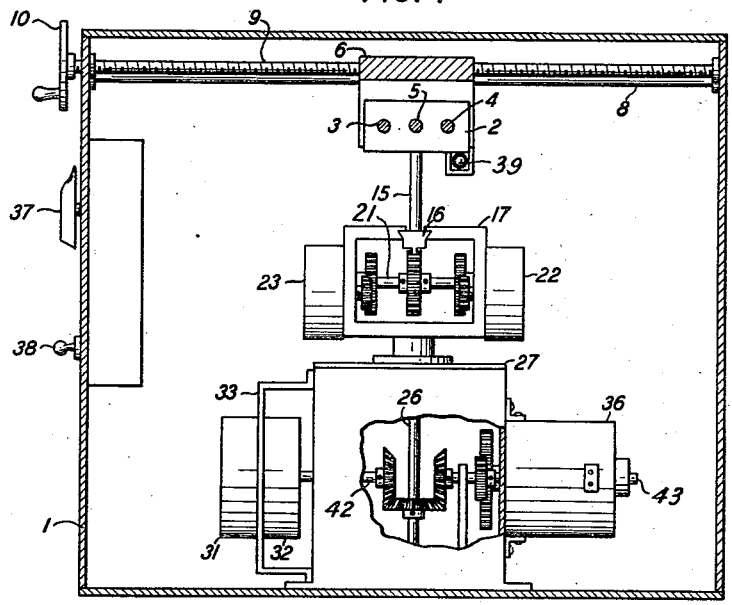
Fig. 4 is a side view with the parts in position to generate an overhead course.
Figure 5:
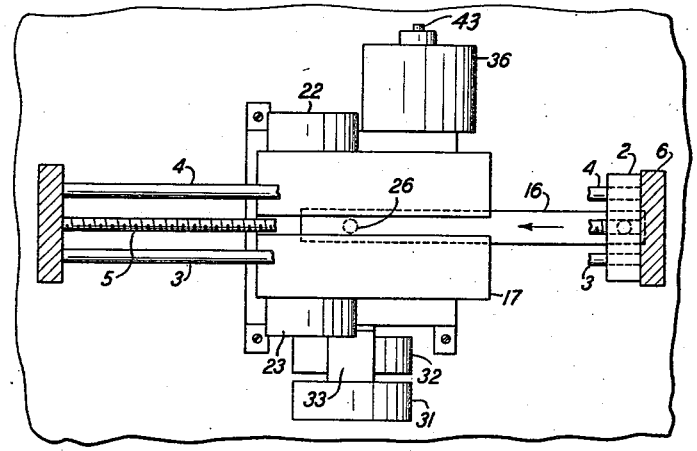
Fig. 5 is a fragmentary top plan view illustrating the generator at the beginning of an overhead course.

Assume next that the instructor desires to generate a course which passes directly over the point of observation O. Such a course would correspond to the case in which an airplane flies along a course directly overhead. Assuming as before that the tracking head 2 is at the extreme right-hand end of the carriage 6, the instructor now manipulates the hand wheel 10 to slide the carriage 6 along the rods 7 and 8 until the rack 16 is parallel to and lies directly under the threaded shaft 5 as seen in Fig. 5. He then adjusts the speed control pointer 37 to select a desired speed of flight and operates the switch 38, closing the circuit of the flight motor 11 to drive the head 2 from right to left along the carriage 6. Since the axes of the azimuth shaft 26 and link pin 15 are perpendicular to and intersect the line of movement of the tracking head 2, no turning force is exerted on the azimuth frame 17. This force having thus been reduced to zero, the tracking head 2 merely slides the rack 16 into the key-way, reducing the range accordingly and maintaining the azimuth angle at its starting or zero value during the first half of the course. This movement of the tracking head with respect to the azimuth shaft 26, which includes the point of observation, corresponds in Fig. 10 to the movement of the imaginary airplane from the point A along the line OA toward the point O of observation. During this movement in the first half of the course the azimuth angle remains constant at zero value and the horizontal range diminishes at a uniform rate from its starting value OA to zero value.

Figure 6:
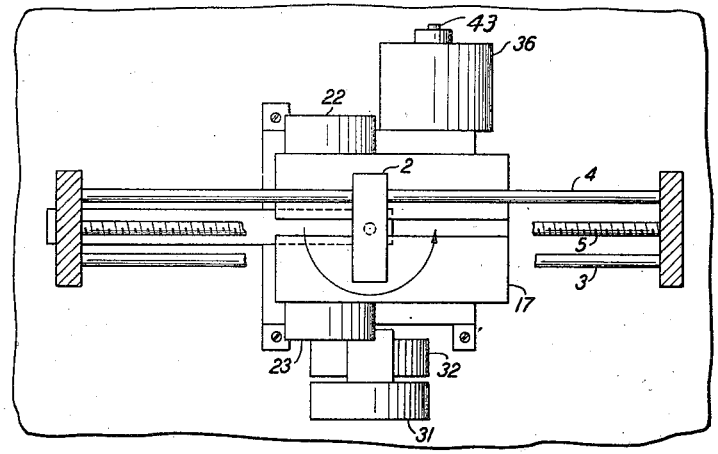
Fig. 6 is a top plan view illustrating the generator as it approaches the midpoint on an overhead course.
Figure 7:
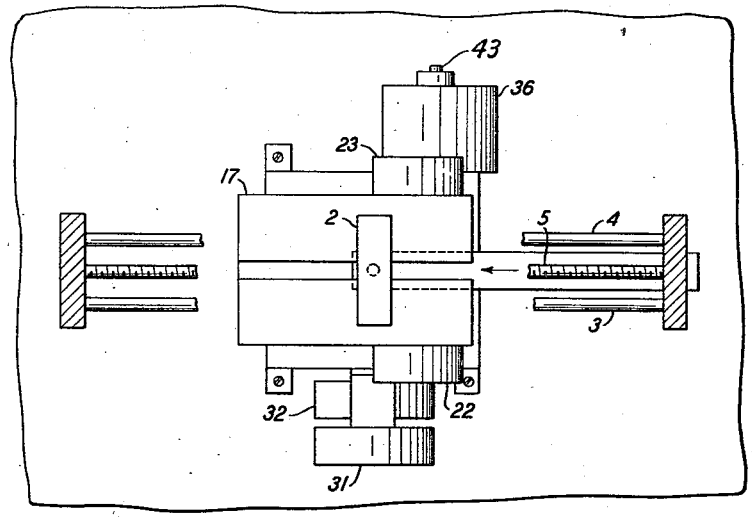
Fig. 7 is a view similar to that of Fig. 6 but illustrating the generator just as it passes the midpoint of the course.
Figure 8:
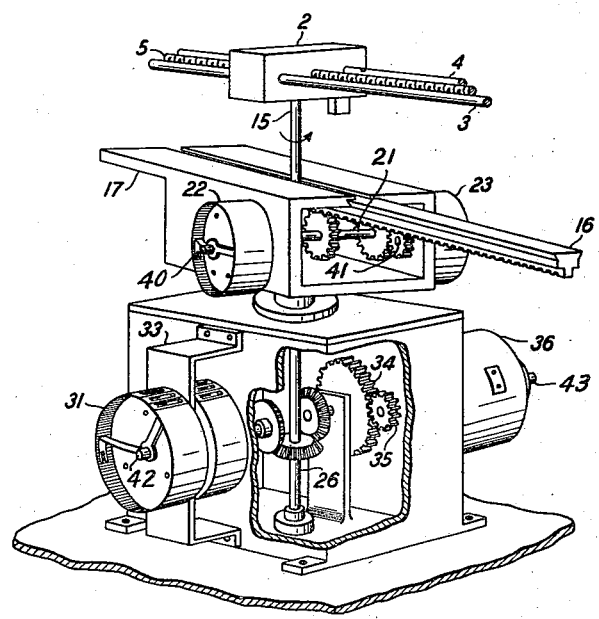
Fig. 8 is a perspective view illustrating the generator in the act of making the azimuth adjustment at the midpoint of the course.

As long as there is a substantial separation between the vertical positions of the azimuth shaft 26 and the link pin 15 the mechanical advantage resulting therefrom prevents the torque motor 36, which is constantly energized, from affecting the angular position of the azimuth shaft. However, as the tracking head 2 advances the link pin 15 into vertical alignment with the azimuth shaft 26, as illustrated in Fig. 6, this mechanical advantage is reduced to zero, and the effort of the torque motor 36 now turns the azimuth shaft 26 and the azimuth frame 17 rapidly through an angle of 180 degrees, causing the frame 17 and rack 16 to assume the position shown in Fig. 7. In Fig. 8 the azimuth frame 17 has nearly completed its rotation of 180 degrees and is approaching the position shown in Fig. 7. This rotation of the azimuth shaft at the midpoint of the course represents the change of 180 degrees in azimuth angle which the moving airplane causes when it passes through the point in its course which lies directly over the point of observation O.

During the second half of the course the tracking head 2 withdraws the rack 16 from the key-way in the frame 17 and in so doing operates the resistors 22 and 23 to measure the increasing value of the range. When the end of the course is reached, the tracking head 2 operates the switch 39 to open the circuit of the flight motor 11.

Figure 9:
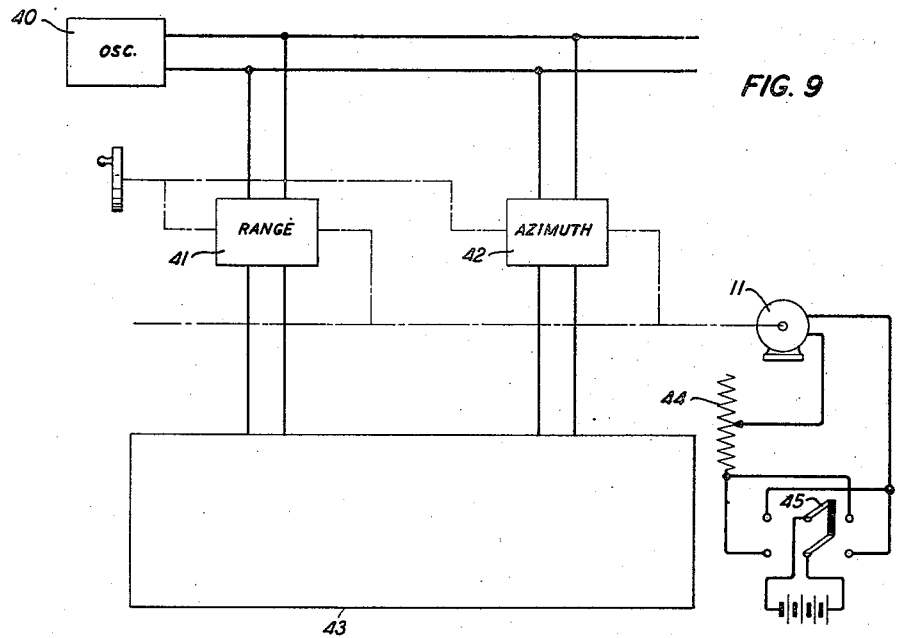
Fig. 9 is a circuit diagram.

While the electrical devices driven by the course generator are illustrated herein as resistors, it will be understood that condensers may be employed for controlling the phase of the alternating waves for giving the desired expression of the changing range and azimuth angles. In Fig. 9, for example, it may be assumed that alternating waves derived from a base source of frequency 40 are applied to the range and azimuth condensers 41 and 42 and that these condensers in their movement under the control of the tracing head 2 produce phase changes in the applied waves which represent the range and angular dimensions. These waves, after undergoing the representative changes of phase, are then utilized by any suitable mechanism 43 to produce the necessary oscilloscope images by means of which the student tests his skill in the art of locating moving objects. For a general understanding of a system of this character reference is made to the copending application of Andrews and Cesareo, Serial No. 513,042, filed December 6, 1943, now Patent No. 2,438,888, and to the copending application of O. Cesareo, Serial No. 513,043, filed December 6, 1943.

In Fig. 9 a rheostat 44 is illustrated by means of which the instructor with his pointer 37 is able to control the speed of the flight motor 11 for simulating the speed of the moving object in space. A reversing switch 45, controlled by the instructor's lever 38, is also illustrated; and as above explained end switches 39 may be provided to stop the generator when it reaches the end of the course in either direction.

While the invention is described particularly in connection with the generation of courses corresponding to imaginary courses in space, it should be understood that the varying electrical quantities produced by the generator may represent the courses of real objects moving in space.

What is claimed is:

1. In a mechanism for simulating courses of movement of an object in space, said object being related to a point of observation by an angular dimension which varies in value, the combination of a movable tracing element, means for driving said element to simulate any desired course, a rotatable member, means for rotating said member in accordance with the movement of said tracing element to represent the changing value of said angular dimension, and means effective at a particular point in a given one of said courses for subjecting said rotating member to a predetermined amount of rotation.

2. In a mechanism for simulating courses of movement of an object in space, said object being related to a point of observation by an azimuth angle which varies in value, the combination of a movable tracing element, means for adjusting the position of said element and for driving it to simulate any desired one of a multiplicity of courses, a rotatable member, means responsive to said tracing element for rotating said member to represent the changing value of said azimuth angle, and means effective at a particular point in a given one of said courses for rotating said member through a predetermined number of degrees.

3. In a mechanism for simulating courses of movement of an object in space, said object being related to a point of observation by an azimuth angle which varies in value, the combination of a movable tracing element, means for adjusting the position of said element and for driving it to simulate any desired one of a multiplicity of courses, a rotatable member, means responsive to said tracing element for rotating said member to represent the changing value of said azimuth angle, and means effective when the simulated course passes overhead with respect to said point of observation and the overhead point is reached for subjecting said rotatable member to a definite amount of rotation.

4. In a mechanism for simulating courses of movement of an object in space, said object being related to a fixed point of observation by an azimuth angle which changes in value with the movement of said object, the combination of a movable tracing element, means for driving said element to simulate any desired course, a rotatable azimuth member, means controlled in accordance with the movement of said tracing element for rotating said azimuth member to represent the changing value of said azimuth angle, and means effective when a certain point in a particular course is reached for rotating said rotatable member through an angle of 180 degrees.

5. In a mechanism for simulating courses of movement of an object in space, said object being related to a fixed point of observation by an azimuth angle which changes in value with the movement of said object, the combination of a movable tracing element, means for driving said element to simulate any desired course, a rotatable azimuth member, means controlled in accordance with the movement of said tracing element for rotating said azimuth member to represent the changing value of said azimuth angle, and a motor acting on said rotatable member and effective when a given point in a particular course is reached for rotating said member through an angle corresponding to the change which occurs in the azimuth angle when said object passes through said given point.

6. In a mechanism for simulating courses of movement of an object in space, said object being related to a point of observation by an azimuth angle which varies in value with the movement of the object along its course, the combination of a movable element, means for adjusting and for driving said movable element to simulate any desired one of a plurality of courses including an overhead course which passes over said point of observation, a rotatable azimuth member, means controlled by said movable element for rotating said azimuth member to represent the changing value of said azimuth angle, a motor constantly applying its torque to said azimuth member and effective when the point above the point of observation is reached in the simulation of an overhead course for rotating said member through an angle corresponding to the change which occurs in the azimuth angle when said object passes through said overhead point and ineffective to rotate said azimuth member at any other point in any of said courses.

7. In a mechanism for simulating courses of movement of an imaginary object in space, said object being related to a point of observation by an angular dimension which varies in value, the combination of a driving shaft, a movable element mounted on said shaft, means for operating said shaft for driving said element along the length thereof to generate courses which simulate the courses of said imaginary object, means for translating said shaft to any desired position to select a course having an desired relation to said point of observation including an overhead course which passes directly over said point, a rotatable member, means responsive to said element when moving along said driving shaft to simulate any course other than an overhead course for applying to said rotatable member a force for rotating it in correspondence with the changing angular dimension of said imaginary object, said force being reduced to the value zero when said movable element is simulating an overhead course, and means effective as the movable element reaches the point over the point of observation when simulating an overhead course for rotating said rotatable member through a number of degrees corresponding to the change in value experienced by said angular dimension as said imaginary object passes through the point above said point of observation.

FREDERICK W. TREPTOW.

REFERENCES CITED

The following references are of record in the file of this patent:

UNITED STATES PATENTS

| Number | Name | Date |
| --- | --- | --- |
| 1,939,706 | Karnes | Dec. 19, 1933 |
| 2,321,799 | Cone | June 15, 1943 |